United States Patent Office 3,792,093

Patented Feb. 12, 1974

1

3,792,093

NITRO ETHYL SULFONES

Greg A. Bullock, Wilmington, Del., assignor to E. I. du Pont de Nemours and Company, Wilmington, Del.

No Drawing. Filed Apr. 21, 1972, Ser. No. 246,495
Int. Cl. C07c 147/02, 147/06
U.S. Cl. 260—607 A 10 Claims

ABSTRACT OF THE DISCLOSURE

Compounds of the formula:

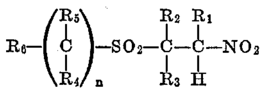

where $R_1$ and $R_2$ are hydrogen or alkyl;
$R_3$ is alkyl or phenyl;
$R_4$ and $R_5$ are hydrogen or methyl;
$R_6$ is a hydrocarbon or substituted hydrocarbon; and
$n$ is 0 or 1;

are useful as fungicides. Typical compounds are:

1-methyl-2-nitroethyl o-tolyl sulfone
1-methyl-2-nitroethyl n-butyl sulfone
1-methyl-2-nitroethyl methyl sulfone
1-phenyl-2-nitroethyl-2-naphthyl sulfone
1-phenyl-2-nitroethyl m-tolyl sulfone
1-phenyl-2-nitroethyl m-methoxyphenyl sulfone.

BACKGROUND OF THE INVENTION

Under certain conditions, crop and ornamental plants may be attacked by plant pathogenic fungi resulting in severely damaged or even dead host plants. Such depredation is accompanied by a vast economic loss throughout the world each year.

Chemical control is often the only feasible means of attacking a disease problem, and although numerous fungicides are available which aid in preventing diseases of agricultural crops, each of these has practical deficiencies which restrict its use. Among these deficiencies are limited spectrum of activity, excessive phytotoxicity to certain crops, high cost, discomfort to the applicator, toxicity hazard to the applicator or the food consuming public, undesirable (either inadequate or excessive) residual life on the crop parts, lack of compatibility with other chemicals that need also to be applied to the crop in question, and unsuitability for desired type of formulation. The addition to the grower's fungicide arsenal of further highly active compounds with desirable use characteristics would represent a substantial contribution in the struggle to produce adequate food for the world population.

This invention provides compounds and methods by which fungal damage to agricultural crops is mitigated or prevented by using small amounts of chemical, with minimum effort, without discomfort or hazard to the operator and without reducing in any way the utility, safety, or quality of agricultural products so protected.

A wide variety of diseases of foliage, fruit, stems and roots of growing plants is controlled by the practice of this invention without damage to the host. Fruits, tubers, bulbs, roots, seeds, and other plant parts harvested for food, animal feeds, or for other purposes are protected from fungal deterioration during processing, distribution, and storage. Seeds, tubers, cuttings, and other plant propagation materials are protected from fungal attack during handling and storage, as well as in the soil after planting.

2

SUMMARY OF THE INVENTION

One aspect of the invention is a method for protecting a locus from damage by fungi by applying to the locus a fungicidally effective amount of a compound of the formula:

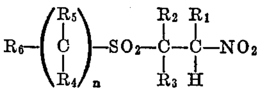

(I)

where $R_1$ and $R_2$ are each independently hydrogen or alkyl of 1–4 carbon atoms;
$R_3$ is alkyl of 1–4 carbon atoms or phenyl; and
$R_4$ and $R_5$ are each independently hydrogen or methyl;
$R_6$ is alkyl of 1–6 carbon atoms, cycloalkyl of 1–6 carbon atoms, alkylcycloalkyl of 4–7 carbon atoms, cycloalkylalkyl of 4–7 carbon atoms, 1- or 2-naphthyl or

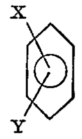

wherein
X is hydrogen, halogen, hydroxyl, alkyl of 1–12 carbon atoms, nitro, or alkoxy of 1–4 carbon atoms; and
Y is hydrogen, halogen, alkyl of 1–4 carbon atoms or alkoxy of 1–4 carbon atoms
with the provision that the total number of carbon atoms in X and Y may not exceed 12;

$n$ is 0 or 1 provided that when $R_6$ is other than aryl, $n$ is 0 and $R_3$ must be alkyl of 1–4 carbon atoms.

Preferred for activity against Rhizopus and Aspergillus are compounds as in Formula I above wherein $R_3$ is alkyl of 1–4 carbon atoms. Compounds that are more preferred for this type of activity are those wherein $R_1$ and $R_2$ are each independently hydrogen or alkyl of 1–4 carbon atoms;
$R_3$ is alkyl of 1–4 carbon atoms;
$R_4$ and $R_5$ are each independently hydrogen or methyl;
$R_6$ is alkyl of 1–6 carbon atoms, cycloalkyl of 1–6 carbon atoms, or

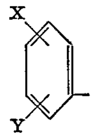

where
X is hydrogen, alkyl of 1–4 carbon atoms, or alkoxy of 1–4 carbon atoms; and
Y is hydrogen;

$n$ is 0 or 1 provided that when $R_6$ is other than aryl, $n$ is 0.

The most preferred compounds are:

1-methyl-2-nitroethyl o-tolylsulfone
1-methyl-2-nitroethyl n-butyl sulfone
1-methyl-2-nitroethyl methyl sulfone.

Preferred for their foliar type activity aginst organisms such as late blight are compounds as in Formula I above wherein $R_3$ is phenyl and $R_6$ is 1- or 2-naphthyl or

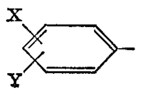

where

X is halogen, methoxy, o-methyl, or m-methyl;
Y is hydrogen; and
$n$ is 0 or 1.

Compounds that are more preferred for this foliar type activity are as above defined with regard to Formula I wherein:

$R_1$ and $R_2$ are hydrogen;
$R_3$ is phenyl;
$R_6$ is 1- or 2-naphthyl or

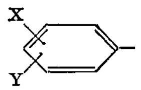

where

X is halogen, methoxy, o-methyl, or m-methyl;
Y is hydrogen; and
$n$ is 0.

The most preferred compounds are:

1-phenyl-2-nitroethyl-2-naphthyl sulfone
1-phenyl-2-nitroethyl m-tolyl sulfone
1-phenyl-2-nitroethyl m-methoxyphenyl sulfone.

DETAILED DESCRIPTION OF THE INVENTION

Preparation of the active compounds

The sulfide intermediates to the compounds of Formula I can be prepared as illustrated by the following equation:

(1)

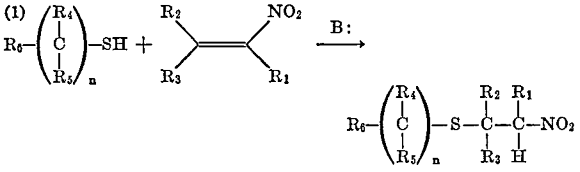

In the method of Equation 1, a properly substituted mercaptan is reacted with a nitroalkene and a catalytic amount of a tertiary amine at 100° C. The resulting sulfide is usually isolated as an oil in nearly quantitative yield.

The sulfones of Formula I are prepared according to the following equation:

(2)

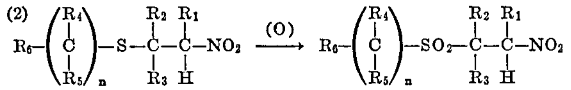

In the method of Equation 2, the crude sulfide from Equation 1 is dissolved in chloroform and oxidized at 0° C. with either 40% peracetic acid or 30% hydrogen peroxide in acetic acid. After evaporating the solvent and washing the residue with hexane, the desired sulfone is isolated as an essentially pure solid.

A few of the sulfones useful in practicing the method of this invention have been previously prepared by Cason and Wasser in J. Am. Chem. Soc., 73, 142 (1951) and Heath and Lambert in J. Chem. Soc., 1477 (1947).

Compositions

Compositions of the present invention can be prepared by mixing at least one of the compounds of Formula I with pest control adjuvants or modifiers to provide compositions in the form of dusts, water-dispersible powders, high-strength concentrates, aqueous dispersions or emulsions and solutions or dispersions in organic liquids.

Thus, the compounds of Formula I can be used with a carrier or diluent agent such as a finely divided solid, an organic liquid, water, a wetting agent, a dispersing agent, an emulsifying agent, or any suitable combination of these Compositions of the invention, especially liquids and wettable powders, contain as a conditioning agent one or more surface-active agents, sometimes called surfactants, in amounts sufficient to render a given composition containing the compounds of Formula I readily dispersible in water or in oil.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1970 Annual by John W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater effectiveness than can be expected from a consideration of the activity of the components used separately. When used at higher rates it is preferred that the surfactant be present in the range of one-fifth to five parts surfactant for each one part of active agent.

In the compositions of this invention, such as wettable powders, suspensions, and slurries, it is preferred to have the active compounds present in the proper amount and in a fine particle size in order to obtain optimum activity. The desired fine particle size can be obtained, for example, by fine grinding. Preferred grinders to obtain such fine particles include ball and pebble mills, sand mills, air mills, pin or stud mills, "Attritors," whizzer mills, ring-roller mills, disk mills and the like. Regardless of the type of grinder used, the grinding process must be carried out under conditions to assure that the product which is made shall have an adequately fine particle size. Particle size classifiers can be used in conjunction with the grinders to help meet this requirement. The use of a grinding aid also helps obtain the desired particle size.

These very finely divided forms of the active ingredient are surprisingly more active than formulations of conventional particle size. The finely divided form has improved penetration into the plants and thus enhances the curative effect. These fine particles also have improved solubility characteristics. Further, these forms are stable and have good residual activity, thus providing preventive control. With many fungicides, a reduction in particle size can lead to problems with phytotoxicity; this is not the case with the finely divided forms of this invention.

By very finely divided form it is meant that the particle size is predominantly less than 5 microns in diameter with at least 40% by weight of the active compound, and preferably 60% by weight, in the form of particles below 2 microns in diameter. The particle size refers to the ultimate particle size as it exists in the spray droplet or dust which contacts the plant. In the dry compositions, or even in the spray slurry before spraying, the fine particles can exist as floccules or aggregates, or agglomerates, in which several fine particles are associated together.

(A) Wettable powders

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of Formula 1 are of mineral origin.

The classes of the extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers" 1970 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene- and alkylnaphthalenesulfonates, sulfated fatty alcohols, amines or acid amides, long-chain acid esters of sodium isethionates, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalenesulfonates, sodium napthalenesulfonate, polymethylene bisnaphthalenesulfonate, and sodium N-methyl-N-(long-chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

(B) High-strength compositions and aqueous suspension concentrates

High-strength compositions generally consist of 90 to 99.5% active ingredient and 0.5 to 10% of a liquid or solid surfactant such as those described by McCutcheon in "Detergents and Emulsifiers" 1970 Annual. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% active ingredient, from 45 to 70% water with the remainder made up of surfactants, corrosion inhibitors, and suspending agents.

Suspensions in organic liquids can be prepared in a similar manner such as by replacing the water with mineral oil.

(C) Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid adsorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and other flours of organic origin.

Preferred grinding aids are attapulgite clay, diatomaceous silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material. 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

(D) Emulsifiable oils

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water miscible esters, or ketones. Suitable surfactants are those anionic or non-ionic agents known to the art as emulsifying agents. Such compounds can be found listed in "Detergents and Emulsifiers" 1970 Annual by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of sulfone can be used.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solution may be intended merely for extension with other oils, such as weed oils. In this instance the emulsifying agents may be omitted and may be replaced by additional solvent.

(E) Ultra-low-volume applications

While conventional applications of sprayable formulations have usually been made in a dilute form (for example at a rate of about 200 liters per hectare or more), the compounds of this invention can also be applied at higher concentrations in the typical "ultra-low-volume" or "low-volume" applications from aircraft or ground sprayers. For this purpose wettable powders can be dispersed in small amounts of aqueous or non-aqueous carrier. The suspension or emulsifiable concentrates can be used directly or with minor dilution. Special compositions particularly suitable for low volume applications are solutions or finely divided suspensions in one or more carriers such as dialkylformamides, N-alkylpyrrolidones, dimethyl sulfoxide, water, esters, ketones, glycols, glycol ethers and the like. Other suitable carriers include aromatic hydrocarbons (halogenated and non-halogenated), aliphatic hydrocarbons (halogenated and non-halogenated) and the like.

Utility

The many fungi against which the compounds and methods of this invention are effective may be represented by, but are not limited to the following: *Phytophthora infestans,* which causes late blight of potato and tomato; *Phytophthora cinnamomi,* which causes root rot of many perennial plant and heart rot of pineapple. *Phytophthora parasitica* and *Phytophthora citrophthora,* which cause root rot and brown fruit rot of citrus; *Plasmopara viticola,* which causes downy mildew of grape; *Pseudoperonospora cubensis,* which causes downy mildew of cucurbits; *Phytophthora phaseoli,* which causes downy mildew of lima bean; *Peronospora effusa,* which causes downy mildew of spinach; *Venturia inaequalis,* which causes apple scab; *Helminthosporum turcicum* and *Helminthosporum maydis* which causes Northern and Southern corn leaf blights; *Helminthosporium sativum, Helminthosporum gramineum, Helminthosporum teres, Helminthosporum carbonum,* and *Helminthosporum victoriae* which cause leaf spots, seedling blights, and root rots of small grains and corn, *Alternaria tenius* which causes brown leaf spot on tobacco and acts as a secondary parasite on a number of crops; *Alternaria brassica, Alternaria cucumerina, Alternaria danci,* and *Alternaria solai* which attack plants in the Cruciferae, Cucurbitaceae, Umbelliferae, and Solanaceae families; *Gibberella zeae* which causes seedling blight and other diseases of corn and small grains; *Gibberella fujikuroi* which causes kernel rot of corn and "bakanae disease" of rice; and Aspergillus spp. Penicillium spp. which cause decay and produce mycotoxins in stored grains and foodstuffs; Pythium spp. which cause damping-off and root rot; *Rhizoctonia solani* which causes soreshin of cotton and beans; *Thielaviopsis basicola* which causes root rot of tobacco and cotton; Fusarium spp. which cause root rot of beans, cabbage and other plants; *Sclerotina sclerotiorum* which causes soft rot or damping-off in carrots; Verticillium spp. which cause defoliation of cotton; and *Rhizopus nigricans* which causes soft rot of many vegetables and fruit.

The compounds of this invention provide protection from damage caused by certain fungi when applied to the proper locus by the methods described hereinafter and at a sufficient rate to exert the desired effect. They are especially suited for the protection of living plants such as fruit-bearing trees, nut-bearing trees, ornamental trees, forest trees, vegetable crops, horticultural crops (including ornamentals, small fruits, and berries), fiber crops, grain and seed crops, sugarcane, sugar beets, pineapple, forage and hay crops, beans, peas, soybeans, peanuts, potatoes, sweet potatoes, tobacco, hops, turf, and pasture.

Living plants may be protected from fungi by applying one or more of the compounds of this invention to the soil in which they are growing or in which they may subsequently be seeded or planted, to seeds, tubers, bulbs, or other plant reproductive parts prior to planting, as well as to foiliage, stems, and/or fruit of the living plant.

Soil applications are made from dusts, slurries or solution. Preferred rates for application of the compounds of this invention to soil in which plants are or will be growing range from 1 to 500 parts per million by weight of the soil in which the roots are or will be growing. More preferred use rates are in the range of 2 to 200 parts per million. The most preferred rates are in the range of 5 to 50 parts per million.

For control of soil fungi the compounds of this invention may be applied as broadcast or band treatments either prior to or at planting time. They may also be applied as a side-dress to living plants on the surface, or shanked or drenched into the soil. When applied in a band they may be soil-incorporated by rotovation. An alternative and very useful band treatment consists of spraying, dusting or sprinkling granules or pellets into the open furrow either just prior to or just following seed placement, and then closing the furrow. Generally, the more evenly the material is applied, the more uniformly it will protect the plants against the fungi.

Preferred rates for application to seeds, tubers, bulbs, or other plant reproductive parts range from 1 to 100 grams of active compound of this invention per kilo of planting material treated. More preferred rates are in the range of 2 to 75 grams of active compound per kilo. The most preferred rates are in the range of 5 to 50 grams per 100 kilos. Applications of this type are made from dusts, slurries or solutions.

Preferred rates of application for the compounds of this invention to foliage, stems and for fruit of living plants range from 0.25 to 50 kilograms of active ingredient per hectare. Most preferred rates are in the range of 0.5 to 25 kilos per hectare. The most preferred rates are in the range of 1.0 to 15 kilograms per hectare. The optimum amount within this range depends upon a number of variables which are well known to those skilled in the art of plant protection. The variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Plant parts such as fruits, tubers, bulbs, foliage, roots and the like, harvested for food or feed, are protected from decay and other deterioration caused by fungi during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compounds, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

The pressures of an expanding world population, together with the need for more economical agricultural practices have resulted in earlier harvesting of grains, including corn. Frequently the corn is stored or sold to grain elevators without proper drying. Spoilage of the grain under these conditions may be quite rapid, with the formation of toxins and other substances that are very harmful or fatal when fed to animals.

Safe, effective feed additives that combat spoilage are thus of great importance to agriculture.

The compounds of this invention can be used to prevent the spoilage of animal feeds. In particular, when mixed with the feed, they provide more efficient and longe lasting protection without harm or injury to livestock that consume it. The compounds of this invention may be conveniently formulated for this use in a number of the ways previously disclosed and these formulations may be mixed directly with mixed feed, newly harvested hay and newly harvested grain. These compounds effectively prevent the spoilage of corn, sorghum, wheat, barley, oats, rye and other grains that may be used as livestock feed.

Under normal conditions, these compounds may be incorporated into feeds at rates of from 0.01% to 0.25% with excellent results. Higher rates may be required under very damp conditions. The more volatile compounds are more effective when confined as a fumigant.

The compounds may also be used to improve the performance of other feed additives, such as sodium propionate, by mixing the two additives directly, or by adding them separately to the feed to be protected.

Wood, leather, fabric, fiber board, paper and other industrial materials of an organic nature can be protected from decomposition or discoloration by fungi by coating, incorporating, fumigating or impregnating with an effective amount of one or more of the compounds of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 5%.

Luggage, shoes, shower curtains, carpets, mats, clothing and other useful household, public or industrial items are protected from rot, fungus stains and unsightly mold growth by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 5,000 parts per million. Fluids for aerosol applications and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

As was pointed out earlier, the compounds of this invention are especially suited for use on living plants. Application to the foliage, stems and fruit of plants at the rate indicated above is generally accomplished by employing sprays, dusts or aerosols containing the proper amount of active ingredient. For the control of fungi which are regularly present, applications often start prior to the time that the problem actually appears and continue on a predetermined schedule. Such a procedure is termed "preventive" or "protective."

Disease control with the compounds of this invention is sometimes improved by including a proper quantity of a surface active agent in the spray or dust applied to the plant. The most preferred surface active agents for this purpose include vinyl or other polymeric resins, glycol esters, ethoxylated fatty acids, alcohol sulfates, lecithin and lecithin derivatives, isethionates, certain phosphate derivatives, and taurates. Somewhat less preferred but, nevertheless, effective surface active agents include sulfosuccinate derivatives, ethoxylated fatty esters and oils, ethoxylated alcohols, and dodecyl- and tridecylbenzenesulfonates and free acids. Examples of specific surface active agents in each of these several categories are listed on pp. 11 to 17 inclusive in "Detergents and Emulsifiers" 1970 Annual published by John W. McCutcheon, Inc., 236 Mount Kemble Ave., Morristown, N.J.

The preferred rates for these surfactants when used in sprays are in the range from 10 to 100,000 parts per million of the spray fluid. More preferred rates are in the range of 30 to 30,000 parts per million. The most preferred rates are in the range of 100 to 10,000 parts per million.

For dusts, the preferred surfactant rates are in the range of 1,000 to 300,000 parts per million of the material actually applied. More preferred rates are in the range of 5,000 to 200,000 parts per million and the most preferred rates are in the range of 10,000 to 100,000 parts per million.

To the active ingredient of this invention, one or more conventional insecticides, miticides, bactericides, nematicides, fungicides, or other agricultural chemicals such as fruit set agents, fruit thinning compounds, fertilizer ingredients and the like, may be added so that the compositions can serve useful purposes in addition to the control of fungi. The additional pesticides are employed in mixtures or combinations in amounts ranging from one-tenth to ten times that of the compound or compounds of this invention. The proper choice of amounts for the added pesticides is readily made by one skilled in the art of protecting plants from pest depredations.

The following are illustrative of the agricultural chemicals that can be included in the compositions or, additionally, that may be added to sprays containing one or more of the active compounds.

sulfur;
methyl 1-(butylcarbamoyl-2-benzimidazolecarbamate benomyl);
methyl 2-benzimidazolecarbamate;
p-dichlorobenzene;
napthalene;
tetraalkylthiuram disulfide such as tetramethylthiuram; disulfide or tetraethylthiuram disulfide;

metal salts of ethylenebisdithiocarbamic acid, e.g. manganese, zinc iron and sodium salts (maneb, zineb, etc.);
pentachloronitrobenzene;
N-dodecylguanidine acetate (dodine);
N-[(trichloromethyl)thio]-4-cyclohexene-1,2-dicarboximide (captan);
2,4-dichloro-6-(o-chloroaniline)-α-triazine (Dryrene®);
1,4-dichloro-2,5-dimethoxybenzene (chloroneb);
metal (e.g. iron, sodium and zinc), ammonium and amine salts of dialkyl dithiocarbamic acids;
triphenyltin acetate (fentin acetate);
hexachlorobenzene;
hexachlorophene;
tribasic copper sulfate;
tetrachloroquinone;
1,2-dibromo-3-chloropene;
1,2-dibromo-3-chloropropane;
dichloropropane-dichloropropene mixture;
ethylene dibromide;
chloropicrin;
sodium dimethyldithiocarbamate;
tetrachloroisophthalonitrile;
2-(2,4,5-trichlorophenoxy)propionic acid;
p-chlorophenoxyacetic acid;
1,2,3,4,5,6-hexachlorocyclohexane (lindane);
methyl N-(methylcarbamoyloxy)thiolacetimidate (methomyl);
S-methyl 1-(dimethylcarbamoyl)-N-[(methylcarbamoyl)oxy]-thioformimidate (oxamyl);
1,1,1-trichloro-2,2-bis(p-methoxyphenyl)ethane (methoxychlor);
1-naphthyl N-methylcarbamate (carbaryl);
methylcarbamic acid, ester with 1,3-dithiolan-2-one oxime;
O,O-dimethyl 1-hydroxy-2,2,2-trichloroethyl phosphonate (diazinon);
O,O-dimethyl S-(1,2-dicarbethoxyethyl) dithiophosphate (malathion);
O,O-dimethyl O-(3-chloro-4-nitrophenyl) thiophosphate;
O,O-diethyl-O-p-nitrophenyl thiophosphate (parathion);
O,O-dimethyl O-(2,2-dichlorovinyl) phosphate (dichlorvos);
O,O-dimethyl S-[4-oxo-1,2,3-benzotriazine-3(4H)-yl-methyl)]-phosphorodithioate (azinphosmethyl);
calcium arsenate;
dibasic lead arsenate;
O,O-diethyl O-[2-(ethylmercapto)ethyl] thiophosphate (demeton);
2,4-dinitro-6-sec-butylphenol;
toxaphene;
O-ethyl O-p-nitrophenyl benzenethiophosphonate (EPN);
tetraethyl pyrophosphate (TEPP);
4,4-dichloro-α(trichloromethyl)benzylhydrol.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The following examples illustrate the utility of the compounds within the scope of Formula 1. All percentages are given by weight unless otherwise indicated. ,

EXAMPLES

In order that the invention may be better understood, the following examples are given.

Preparation of active ingredients

Example 1.—Preparation of 1-phenyl-2-nitroethyl o-tolyl sulfone: A mixture of thirty-five parts of β-nitrostyrene, thirty parts o-thiocresol and 5 drops of triethylamine is heated at 100° C. for 1 hour. The resulting oil is diluted with three hundred parts of chloroform and cooled to 0–5° C. in an ice bath. Ninety-two parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Fifty-six parts of essentially pure 1-phenyl-2-nitroethyl o-tolyl sulfone is obtained. The compound is purified by recrystallization from ethanol to give forty-nine parts of pure material, M.P. 116.5–18° C.

Example 2.—Preparation of 1-phenyl-2-nitroethyl p-tert-butylphenyl sulfone: A mixture of six parts of β-nitrostyrene, six parts 4-tert-butylthiophenol and 5 drops of triethylamine is heated at 100° C. for 1 hour. The resulting brown solid is dissolved in sixty parts of chloroform and cooled to 0–5° C. in an ice bath. Fifteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Nine parts of essentially pure 1-phenyl-2-nitroethyl p-tert-butylphenyl sulfone is obtained. The compound is purified by recrystallization from acetonitrile to give eight parts of pure material, M.P. 177–178° C.

Example 3.—Preparation of 1-phenyl-2-nitroethyl m-methoxyphenyl sulfone: A mixture of five parts of β-nitrostyrene, five parts m-methoxythiophenol and 5 drops of triethylamine is heated at 100° C. for 1 hour. The resulting oil is diluted with seventy parts of chloroform and cooled to 0–5° C. in an ice bath. Thirteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Five parts of essentially pure 1-phenyl-2-nitroethyl m-methoxyphenyl sulfone is obtained. The compound is purified by recrystallization from methanol to give three parts of pure material, M.P. 121–122.5° C.

Example 4.—Preparation of 1-phenyl-2-nitroethyl p-bromo phenyl sulfone: A mixture of six parts of β-nitrostyrene, eight parts 4-bromothiophenol and 5 drops of triethylamine is heated at 100° C. for 1 hour. The resulting oil is diluted with fifty parts of chloroform and cooled to 0–5° C. in an ice bath. Sixteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Fifteen parts of essentially pure 1-phenyl-2-nitroethyl p-bromophenyl sulfone is obtained. The compound is purified by recrystallization from methanol to give thirteen parts of pure material, M.P. 146–148° C.

Example 5.—Preparation of 1-phenyl-2-nitroethyl benzyl sulfone: A mixture of six parts of β-nitrostyrene, five parts benzyl mercaptan and 5 drops of triethylamine is heated at 100° C. for 1 hour. The resulting oil is diluted with fifty parts of chloroform and cooled to 0–5° C. in an ice bath. Sixteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Thirteen parts of essentially pure 1-phenyl-2-nitroethyl benzyl sulfone is obtained. The compound is purified by recrystallization from methanol to give ten parts of pure material, M.P. 145–147° C.

Example 6.—Preparation of 1-phenyl-2-nitroethyl p-methoxybenzyl sulfone: A mixture of six parts of β-nitrostyrene, six parts p-methoxybenzyl mercaptan and 5 drops of triethylamine is heated at 100° C. for 1 hour. The resulting oil is diluted with fifty parts of chloroform and cooled to 0–5° C. in an ice bath. Fifteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Nine parts of essentially pure 1-phenyl-2-nitroethyl p-methoxybenzyl sulfone is obtained. The compound is purified by recrystallization from methanol to give seven parts of pure material, M.P. 112–113° C.

Example 7.—Preparation of 1-phenyl-2-nitroethyl 3,4-dichlorophenyl sulfone: A mixture of six parts of β-nitrostyrene, seven parts 3,4-dichlorothiophenol and 5 drops of triethylamine are heated at 100° C. for 1 hour. The resulting oil is diluted with fifty parts of chloroform and cooled to 0–5° C. in an ice bath. Sixteen parts of 40% peracetic acid is added dropwise to this stirred solution. The temperature is maintained below 10° C. during this addition. The solution is stirred at 5° for one hour and then overnight at room temperature. The solvent is evaporated and the white solid which forms is treated with hexane and collected by filtration. Fourteen parts of essentially pure 1-phenyl-2-nitroethyl 3,4-dichlorophenyl sulfone is obtained. The compound is purified by recrystallization from ethanol to give twelve parts of pure material, M.P. 119–121° C.

The following compounds are prepared as in Examples 1 through 7 by substituting the listed thiophenols or benzyl mercaptans and β-nitrostyrenes set forth in the table for the thiophenols or benzyl mercaptans and β-nitrostyrene in Examples 1 through 7.

| Thiophenol starting reactant | Nitrostyrene starting reactant | Sulfone product |
|---|---|---|
| p-Thiocresol | β-Nitrostyrene | 1-phenyl-2-nitroethyl p-tolyl sulfone, M.P., 145–147° C. |
| p-Chlorothiophenol | do | 1-phenyl-2-nitroethyl p-chlorophenyl sulfone, M.P., 138–139° C. |
| p-Ethoxythiophenol | do | 1-phenyl-2-nitroethyl p-ethoxyphenyl sulfone. |
| o-fluorothiophenol | do | 1-phenyl-2-nitroethyl o-fluorophenyl sulfone. |
| o-Butoxythiophenol | do | 1-phenyl-2-nitroethyl o-butoxyphenyl sulfone. |
| p-Dodecylthiophenol | do | 1-phenyl-2-nitroethyl p-dodecylphenyl sulfone. |
| m-Iodothiophenol | do | 1-phenyl-2-nitroethyl m-iodophenyl sulfone. |
| p-Isopropylthiophenol | do | 1-phenyl-2-nitroethyl p-isopropylphenyl sulfone. |
| m-Hydroxythiophenol | do | 1-phenyl-2-nitroethyl m-hydroxyphenyl sulfone. |
| m-Thiocresol | do | 1-phenyl-2-nitroethyl m-tolyl sulfone, M.P., 136–138° C. |
| m-Chlorothiophenol | do | 1-phenyl-2-nitroethyl m-chlorophenyl sulfone. |
| 2-chloro-4-methylthiophenol | do | 1-phenyl-2-nitroethyl 2-chloro-4-methylphenyl sulfone. |
| 2-dodecyl-4-bromothiophenol | do | 1-phenyl-2-nitroethyl 2-dodecyl-4-bromophenyl sulfone. |
| 3-chloro-4-tert-butylthiophenol | do | 1-phenyl-2-nitroethyl 3-chloro-4-tert-butylphenyl sulfone. |
| 2-bromo-3-methoxythiophenol | do | 1-phenyl-2-nitroethyl 2-bromo-3-methoxyphenyl sulfone. |
| 2-methoxy-4-fluorothiophenol | do | 1-phenyl-2-nitroethyl 2-methoxy-4-fluorophenyl sulfone. |
| 3-ethoxy-4-iodothiophenol | do | 1-phenyl-2-nitroethyl 3-ethoxy-4-iodophenyl sulfone. |
| 3,4-dibromothiophenol | do | 1-phenyl-2-nitroethyl 3,4-dibromophenyl sulfone. |
| 2,4-dichlorothiophenol | do | 1-phenyl-2-nitroethyl 2,4-dichlorophenyl sulfone. |
| 3-bromo-4-butoxythiophenol | do | 1-phenyl-2-nitroethyl 3-bromo-4-butoxyphenyl sulfone. |
| 2-hydroxy-4-chlorothiophenol | do | 1-phenyl-2-nitroethyl 2-hydroxy-4-chlorophenyl sulfone. |
| 3-hydroxy-4-bromothiophenol | do | 1-phenyl-2-nitroethyl 3-hydroxy-4-bromophenyl sulfone. |
| 2-methyl-4-hydroxythiophenol | do | 1-phenyl-2-nitroethyl 2-methyl-4-hydroxyphenyl sulfone. |
| 2-hydroxy-4-dodecylthiophenol | do | 1-phenyl-2-nitroethyl 2-hydroxy-4-dodecylphenyl sulfone. |
| 3-hydroxy-4-tert-butylthiophenol | do | 1-phenyl-2-nitroethyl 3-hydroxy-4-tert-butylphenyl sulfone. |
| 2-hydroxy-4-isopropoxythiophenol | β-Methyl-β-nitrostyrene | 1-phenyl-2-nitropropyl 2-hydroxy-4-isopropoxyphenyl sulfone. |
| 2-methoxy-3-hydroxythiophenol | β-Nitrostyrene | 1-phenyl-2-nitroethyl 2-methoxy-3-hydroxyphenyl sulfone. |
| 3-hydroxy-4-tert-butoxythiophenol | do | 1-phenyl-2-nitroethyl 3-hydroxy-4-tert-butoxyphenyl sulfone. |
| 3,4-dimethylthiophenol | β-Methyl-β-nitrostyrene | 1-phenyl-2-nitropropyl 3,4-dimethylphenyl sulfone. |
| 2-methyl-4-tert-butylthiophenol | β-n-Propyl-β-nitrostyrene | 1-phenyl-2-nitropentyl 2-methyl-4-tert-butylphenyl sulfone. |
| 2-undecyl-4-methylthiophenol | β-n-Butyl-β-nitrostyrene | 1-phenyl-2-nitrohexyl 2-undecyl-4-methylphenyl sulfone. |
| 2,4-diisopropylthiophenol | β-Ethyl-β-nitrostyrene | 1-phenyl-2-nitrobutyl 2,4-diisopropylphenyl sulfone. |
| 2-fluoro-4-isopropylthiophenol | β-Methyl-β-nitrostyrene | 1-phenyl-2-nitropropyl 2-fluoro-4-isopropylphenyl sulfone. |
| 3,4-diethylthiophenol | β-Isobutyl-β-nitrostyrene | 1-phenyl-4-methyl-2-nitropentyl 3,4-diethylphenyl sulfone. |
| 1-naphthalenethiol | β-Nitrostyrene | 1-phenyl-2-nitroethyl 1-naphthyl sulfone. |
| o-Ethylthiophenol | β-Isopropyl-β-nitrostyrene | 1-phenyl-2-nitro-3-methylbutyl o-ethylphenyl sulfone. |
| p-Ethylthiophenol | β-Nitrostyrene | 1-phenyl-2-nitroethyl p-ethylphenyl sulfone. |
| 3,4-dimethoxythiophenol | do | 1-phenyl-2-nitroethyl 3,4-dimethoxyphenyl sulfone. |
| 2,5-dimethoxythiophenol | do | 1-phenyl-2-nitroethyl 2,5-dimethoxyphenyl sulfone. |
| 3,5-dimethoxythiophenol | β-Methyl-β-nitrostyrene | 1-phenyl-2-nitropropyl 3,5-dimethoxyphenyl sulfone. |
| 2,5-dimethylthiophenol | β-Sec-butyl-β-nitrostyrene | 1-phenyl-2-nitro-3-methylpentyl 2,5-dimethylphenyl sulfone. |
| 2,6-dichlorothiophenol | β-Methyl-β-nitrostyrene | 1-phenyl-2-nitropropyl 2,6-dichlorophenyl sulfone. |
| 2-methoxy-4-tert-butoxythiophenol | β-Ethyl-β-nitrostyrene | 1-phenyl-2-nitrobutyl 2-methoxy-4-tert-butoxyphenyl sulfone. |
| 2-methyl-5-ethoxythiophenol | β-n-Butyl-β-nitrostyrene | 1-phenyl-2-nitrohexyl 2-methyl-5-ethoxyphenyl sulfone. |
| 2,5-dichlorothiophenol | β-Nitrostyrene | 1-phenyl-2-nitroethyl 2,5-dichlorophenyl sulfone, M.P., 53–55° C. |
| 2-naphthalenethiol | do | 1-phenyl-2-nitroethyl 2-naphthyl sulfone, M.P., 164–165° C. |
| 4-bromo-3-methylthiophenol | do | 1-phenyl-2-nitroethyl 4-bromo-3-methylphenyl sulfone, M.P., 136–137° C. |
| m-Thiocresol | β-Methyl-β-nitrostyrene | 1-phenyl-2-nitropropyl m-tolyl sulfone. |
| p-Chlorothiophenol | do | 1-phenyl-2-nitropropyl p-chlorophenyl sulfone. |
| p-n-Propoxythiophenol | β-Ethyl-β-nitrostyrene | 1-phenyl-2-nitrobutyl p-(n-propoxy)phenyl sulfone. |
| p-Fluorothiophenol | β-n-Propyl-β-nitrostyrene | 1-phenyl-2-nitropentyl p-fluorophenyl sulfone. |
| p-Ethylthiophenol | β-Methyl-β-nitrostyrene | 1-phenyl-2-nitropropyl p-ethylphenyl sulfone. |
| p-Bromothiophenol | do | 1-phenyl-2-nitropropyl p-bromophenyl sulfone. |
| p-tert-Butylthiophenol | do | 1-phenyl-2-nitropropyl p-tert-butylphenyl sulfone. |
| p-Hydroxythiophenol | β-Ethyl-β-nitrostyrene | 1-phenyl-2-nitrobutyl p-hydroxyphenyl sulfone. |
| o-Chlorothiophenol | β-n-Propyl-β-nitrostyrene | 1-phenyl-2-nitropentyl o-chlorophenyl sulfone. |
| p-Thiocresol | β-Isobutyl-β-nitrostyrene | 1-phenyl-2-nitro-4-methylpentyl p-tolyl sulfone. |
| o-Thiocresol | β-Methyl-β-nitrostyrene | 1-phenyl-2-nitropropyl o-tolyl sulfone. |
| 2,4-dichlorothiophenol | β-Ethyl-β-nitrostyrene | 1-phenyl-2-nitrobutyl 2,4-dichlorophenyl sulfone. |
| 3,4-dichlorothiophenol | β-n-Propyl-β-nitrostyrene | 1-phenyl-2-nitropentyl 3,4-dichlorophenyl sulfone. |
| 3,4-dimethylthiophenol | β-n-Butyl-β-nitrostyrene | 1-phenyl-2-nitrohexyl 3,4-dimethylphenyl sulfone. |
| p-Fluorothiophenol | β-Nitrostyrene | 1-phenyl-2-nitroethyl p-fluorophenyl sulfone, M.P., 151–152° C. |
| p-Nitrothiophenol | do | 1-phenyl-2-nitroethyl p-nitrophenyl sulfone, M.P., 147–151° C. |

| Benzyl mercaptan starting reactant | Nitrostyrene starting reactant | Sulfone product |
|---|---|---|
| o-Bromobenzyl mercaptan | β-Nitrostyrene | 1-phenyl-2-nitroethyl o-bromobenzyl sulfone. |
| m-Chlorobenzyl mercaptan | do | 1-phenyl-2-nitroethyl m-chlorobenzyl sulfone. |
| p-Fluorobenzyl mercaptan | do | 1-phenyl-2-nitroethyl p-fluorobenzyl sulfone. |
| m-Iodobenzyl mercaptan | do | 1-phenyl-2-nitroethyl m-iodobenzyl sulfone. |
| p-Chlorobenzyl mercaptan | do | 1-phenyl-2-nitroethyl p-chlorobenzyl sulfone, M.P., 105–106° C. |
| o-Hydroxybenzyl mercaptan | do | 1-phenyl-2-nitroethyl o-hydroxybenzyl sulfone. |
| p-Hydroxybenzyl mercaptan | do | 1-phenyl-2-nitroethyl p-hydroxybenzyl sulfone. |
| o-Methylbenzyl mercaptan | do | 1-phenyl-2-nitroethyl o-methylbenzyl sulfone. |
| p-Methylbenzyl mercaptan | do | 1-phenyl-2-nitroethyl p-methylbenzyl sulfone. |
| p-tert-Butylbenzyl mercaptan | do | 1-phenyl-2-nitroethyl p-tert-butylbenzyl sulfone. |

TABLE—Continued

| Benzyl mercaptan starting reactant | Nitroalkene starting reactant | Sulfone product |
|---|---|---|
| m-Isopropylbenzyl mercaptan | do | 1-phenyl-2-nitroethyl m-isopropylbenzyl sulfone. |
| p-Ethylbenzyl mercaptan | do | 1-phenyl-2-nitroethyl p-ethylbenzyl sulfone. |
| o-Ethylbenzyl mercaptan | do | 1-phenyl-2-nitroethyl o-ethylbenzyl sulfone. |
| p-Dodecylbenzyl mercaptan | do | 1-phenyl-2-nitroethyl p-dodecylbenzyl sulfone. |
| p-Ethoxybenzyl mercaptan | do | 1-phenyl-2-nitroethyl p-ethoxybenzyl sulfone. |
| m-Methoxybenzyl mercaptan | do | 1-phenyl-2-nitroethyl m-methoxybenzyl sulfone. |
| o-Methoxybenzyl mercaptan | do | 1-phenyl-2-nitroethyl o-methoxybenzyl sulfone. |
| p-tert-Butoxybenzyl mercaptan | do | 1-phenyl-2-nitroethyl p-tert-butoxybenzyl sulfone. |
| 2-chloro-5-methylbenzyl mercaptan | do | 1-phenyl-2-nitroethyl 2-chloro-5-methylbenzyl sulfone. |
| 2-dodecyl-4-iodobenzyl mercaptan | do | 1-phenyl-2-nitroethyl 2-dodecyl-4-iodobenzyl sulfone. |
| 3-bromo-4-tert-butylbenzyl mercaptan | β-Methyl-β-nitrostyrene | 1-phenyl-2-nitropropyl 3-bromo-4-tert-butylbenzyl sulfone. |
| 2-fluoro-3-methoxybenzyl mercaptan | do | 1-phenyl-2-nitropropyl 2-fluoro-3-methoxybenzyl sulfone. |
| 2-methoxy-6-chlorobenzyl mercaptan | β-n-Propyl-β-nitrostyrene | 1-phenyl-2-nitropentyl 2-methoxy-6-chlorobenzyl sulfone. |
| 3-ethoxy-5-fluorobenzyl mercaptan | β-n-Butyl-β-nitrostyrene | 1-phenyl-2-nitrohexyl 3-ethoxy-5-fluorobenzyl sulfone. |
| 2,3-dichlorobenzyl mercaptan | β-Nitrostyrene | 1-phenyl-2-nitroethyl 2,3-dichlorobenzyl sulfone. |
| 2,4-dichlorobenzyl mercaptan | β-Ethyl-β-nitrostyrene | 1-phenyl-2-nitrobutyl 2,4-dichlorobenzyl sulfone. |
| 3,5-dibromobenzyl mercaptan | β-n-Propyl-β-nitrostyrene | 1-phenyl-2-nitropentyl 3,5-dibromobenzyl sulfone. |
| 2,6-difluorobenzyl mercaptan | β-Nitrostyrene | 1-phenyl-2-nitroethyl 2,6-difluorobenzyl sulfone. |
| 3-iodo-4-n-butoxybenzyl mercaptan | do | 1-phenyl-2-nitroethyl 3-iodo-4-n-butoxybenzyl sulfone. |
| 3-hydroxy-4-chlorobenzyl mercaptan | do | 1-phenyl-2-nitroethyl 3-hydroxy-4-chlorobenzyl sulfone. |
| 2-ethoxy-5-methylbenzyl mercaptan | β-Methyl-β-nitrostyrene | 1-phenyl-2-nitropropyl 2-ethoxy-5-methylbenzyl sulfone. |
| 3-methoxy-4-tert-butylbenzyl mercaptan | β-Ethyl-β-nitrostyrene | 1-phenyl-2-nitrobutyl 3-methoxy-4-tert-butylbenzyl sulfone. |
| 2-methoxy-4-n-butoxybenzyl mercaptan | β-Nitrostyrene | 1-phenyl-2-nitroethyl 2-methoxy-4-n-butoxybenzyl sulfone. |
| 2,5-dichlorobenzyl mercaptan | do | 1-phenyl-2-nitroethyl 2,5-dichlorobenzyl sulfone. |
| 2,5-dimethylbenzyl mercaptan | β-Isopropyl-β-nitrostyrene | 1-phenyl-2-nitro-3-methylbutyl 2,5-dimethylbenzyl sulfone. |
| 3,5-dichlorobenzyl mercaptan | β-Isobutyl-β-nitrostyrene | 1-phenyl-2-nitro-4-methylpentyl 3,5-dichlorobenzyl sulfone. |
| 2,6-dimethoxybenzyl mercaptan | do | 1-phenyl-2-nitro-4-methylpentyl 2,6-dimethoxybenzyl sulfone. |
| 3,4-dimethoxybenzyl mercaptan | β-Nitrostyrene | 1-phenyl-2-nitroethyl 3,4-dimethoxybenzyl sulfone. |
| 3,5-diethylbenzyl mercaptan | do | 1-phenyl-2-nitroethyl 3,5-diethylbenzyl sulfone. |
| 2-isopropyl-4-fluorobenzyl mercaptan | β-Methyl-β-nitrostyrene | 1-phenyl-2-nitropropyl 2-isopropyl-4-fluorobenzyl sulfone. |
| 2,4-diisopropylbenzyl mercaptan | do | 1-phenyl-2-nitropropyl 2,4-diisopropylbenzyl sulfone. |
| 2-undecyl-4-methylbenzyl mercaptan | β-Ethyl-β-nitrostyrene | 1-phenyl-2-nitrobutyl 2-undecyl-4-methylbenzyl sulfone. |
| 2-tert-Butyl-4-methylbenzyl mercaptan | β-Nitrostyrene | 1-phenyl-2-nitroethyl 2-tert-butyl-4-methylbenzyl sulfone. |
| 3,4-dimethylbenzyl mercaptan | do | 1-phenyl-2-nitroethyl 3,4-dimethylbenzyl sulfone. |
| 3-hydroxy-4-tert-butoxybenzyl mercaptan | do | 1-phenyl-2-nitroethyl 3-hydroxy-4-tert-butoxybenzyl sulfone. |
| 2-hydroxy-4-methoxybenzyl mercaptan | β-Isopropyl-β-nitrostyrene | 1-phenyl-2-nitro-3-methylbutyl 2-hydroxy-4-methoxybenzyl sulfone. |
| 2-hydroxy-5-isopropoxybenzyl mercaptan | β-Isobutyl-β-nitrostyrene | 1-phenyl-2-nitro-4-methylpentyl 2-hydroxy-5-isopropoxybenzyl sulfone. |
| 3-hydroxy-5-tert-butylbenzyl mercaptan | β-Nitrostyrene | 1-phenyl-2-nitroethyl 3-hydroxy-5-tert-butylbenzyl sulfone. |
| 2-hydroxy-4-dodecylbenzyl mercaptan | β-Methyl-β-nitrostyrene | 1-phenyl-2-nitropropyl 2-hydroxy-4-dodecylbenzyl sulfone. |
| 3-methyl-4-hydroxybenzyl mercaptan | β-Ethyl-β-nitrostyrene | 1-phenyl-2-nitrobutyl 3-methyl-4-hydroxybenzyl sulfone. |
| 3-bromo-4-hydroxybenzyl mercaptan | β-Methyl-β-nitrostyrene | 1-phenyl-2-nitropropyl 3-bromo-4-hydroxybenzyl sulfone. |
| Benzyl mercaptan | do | 1-phenyl-2-nitropropyl benzyl sulfone. |
| o-Chlorobenzyl mercaptan | do | 1-phenyl-2-nitropropyl o-chlorobenzyl sulfone. |
| o-Methylbenzyl mercaptan | do | 1-phenyl-2-nitropropyl o-methylbenzyl sulfone. |
| p-tert-Butylbenzyl mercaptan | β-Ethyl-β-nitrostyrene | 1-phenyl-2-nitrobutyl p-tert-butylbenzyl sulfone. |
| m-Methoxybenzyl mercaptan | β-Methyl-β-nitrostyrene | 1-phenyl-2-nitropropyl m-methoxybenzyl sulfone. |
| p-Bromobenzyl mercaptan | β-n-Propyl-β-nitrostyrene | 1-phenyl-2-nitropentyl p-bromobenzyl sulfone. |
| p-Fluorobenzyl mercaptan | β-n-Butyl-β-nitrostyrene | 1-phenyl-2-nitrohexyl p-fluorobenzyl sulfone. |
| m-Idobenzyl mercaptan | β-Isobutyl-β-nitrostyrene | 1-phenyl-2-nitro-4-methylpentyl m-iodobenzyl sulfone. |
| o-Hydroxybenzyl mercaptan | β-Isopropyl-β-nitrostyrene | 1-phenyl-2-nitro-3-methylbutyl o-hydroxybenzyl sulfone. |
| p-Ethylbenzyl mercaptan | β-Methyl-β-nitrostryene | 1-phenyl-2-nitropropyl p-ethylbenzyl sulfone. |
| 3,4-dichlorobenzyl mercaptan | do | 1-phenyl-2-nitropropyl 3,4-edichlorobenzyl sulfone. |
| 2,5-dimethylbenzyl mercaptan | do | 1-phenyl-2-nitropropy 2,5-dimethylbenzyl sulfone. |
| α-Methylbenzyl mercaptan | β-Nitrostyrene | 1-phenyl-2-nitroethylα -methylbenzyl sulfone. |
| α,α-Dimethylbenzyl mercaptan | do | 1-phenyl-2-nitroethyllα,α-dimethylbenzyl sulfone. |

Example 8.—Preparation of 1-methyl-2-nitroethyl o-tolyl sulfide: A mixture of thirty-five parts of 1-nitro-1-propene [J. Chem. Soc., 1471 (1947)], fifty parts o-thiocresol and 5 drops triethylamine is heated at 100° C. for 15 minutes. The resulting brown oil is essentially pure 1-methyl-2-nitroethyl o-tolyl sulfide: $n^{25}D$ 1.5563; NMR ($CDCl_3$) $\delta$ 1.35 (d., 3, J=7 Hz., $$CH_3\overset{|}{C}H-)$$

2.40 (s., 3, benzylic $CH_3$—), 3.78 (m., 1, $$CH_3\overset{|}{C}H)$$

4.37 (d., 2, J=7 Hz., —$CH_2NO_2$), and 7.27 p.p.m. (m., 4, aromatic).

Example 9.—Preparation of 1-methyl-2-nitroethyl o-tolyl sulfone: Forty-two parts of 1-methyl-2-nitroethyl o-tolyl sulfide is diluted with four hundred parts of chloroform and cooled to 0–5° C. in an ice bath. Seventy-six parts of 40% peracetic acid is added dropwise to this stirred solution which is maintained below 10° C. during the addition. The solution is stirred at 5° C. for one hour and then overnight at room temperature. The solvent is evaporated and the white solid which forms is treated with hexane and collected by filtration. Twenty-five parts of essentially pure 1-methyl-2-nitroethyl o-tolyl sulfone is obtained. The compound is to be purified by recrystallization from ethanol to give twenty-two parts of pure material, M.P. 64–66° C.

Example 10.—Preparation of 1-methyl-2-nitroethyl 2-naphthyl sulfide: A mixture of twenty-six parts of 1-nitro-1-propene [J. Chem. Soc., 1471, (1947)], forty-eight parts 2-naphthalenethiol and 5 drops triethylamine is heated at 100° C. for 15 minutes. The resulting brown oil is essentially pure 1-methyl-2-nitroethyl 2-naphthyl sulfide: $n^{25}D$ 1.6262.

Example 11.—Preparation of 1-methyl-2-nitroethyl 2-naphthyl sulfone: Forty-nine parts of 1-methyl-2-nitroethyl 2-naphthyl sulfide is diluted with four hundred parts of chloroform and cooled to 0–5° C. in an ice bath. Seventy-six parts of 40% peracetic acid is added dropwise to this stirred solution which is maintained below 10° C. during the addition. The solution is stirred at 5° C. for one hour and then overnight at room temperature. The solvent is evaporated and the brown solid which forms is treated with hexane and collected by filtration. Forty-four parts of essentially pure 1-methyl-2-nitroethyl 2-naphthyl sulfone is obtained. The compound can be purified by recrystallization from ethanol to give forty-one parts of pure material, M.P. 103–109° C.

Example 12.—Preparation of 1-methyl-2-nitroethyl p-chlorobenzyl sulfide: A mixture of twenty-six parts of 1-nitro-1-propene [J. Chem. Soc., 1471 (1947)], forty-eight parts p-chlorobenzyl mercaptan and 5 drops triethylamine is heated at 100° C. for 15 minutes. The resulting brown oil is essentially pure 1-methyl-2-nitroethyl p-chlorobenzyl sulfide: $n^{25}D$ 1.5634.

Example 13.—Preparation of 1-methyl-2-nitroethyl p-chlorobenzyl sulfone: Forty-nine parts of 1-methyl-2-nitroethyl p-chlorobenzyl sulfide is diluted with four hundred parts of chloroform and cooled to 0–5° C. in an ice bath. Seventy-six parts of 40% peracetic acid is added dropwise to this stirred solution which is maintained below 10° C. during the addition. The solution is stirred at 5° C. for one hour and then overnight at room temperature. The solvent is evaporated and the white solid which forms is treated with hexane and collected by filtration. Twenty-two parts of essentially pure 1-methyl-2-nitroethyl p-chlorobenzyl sulfone is obtained. The compound can be purified by recrystallization from ethanol to give eighteen parts of pure material, M.P. 45–47.5° C.

Example 14.—Preparation of 1,1-dimethyl-2-nitroethyl phenyl sulfide: A mixture of twenty-eight parts of 1-nitro-2-methyl-1-propene [J. Chem. Soc., 1518 (1947)], thirty-one parts thiophenol and 5 drops triethylamine is heated at 100° C. for 15 minutes. The resulting brown oil is essentially pure 1,1-dimethyl-2-nitroethyl phenyl sulfide: $n^{25}$D 1.5436; NMR ($CDCl_3$) $\delta$ 1.50 (s., 6, $$(CH_3)_2\overset{|}{C}—)$$

4.57 (s., 2, —$CH_2NO_2$), and 7.27 p.p.m. (m., 5, aromatic).

Example 15.—Preparation of 1,1-dimethyl-2-nitroethyl phenyl sulfone: Twenty-one parts of 1,1-dimethyl-2-nitroethyl phenyl sulfide is diluted with four hundred parts of chloroform and cooled to 0–5° C. in an ice bath. Thirty-eight parts of 40% peracetic acid is added dropwise to this stirred solution maintaining the reaction temperature below 10° C. during the addition. The solution is stirred at 5° C. for one hour and then overnight at room temperature. The solvent is evaporated and the white solid which forms is treated with hexane and collected by filtration. Eleven parts of essentially pure 1,1-dimethyl-2-nitroethyl phenyl sulfone is obtained. The compound can be purified by recrystallization from ethanol to give nine parts of pure material, M.P. 83.5–85.5° C.

Example 16.—Preparation of 1-methyl-2-nitropropyl 4-bromo-m-tolyl sulfide: A mixture of ten parts of 2-nitro-2-butene [J. Chem. Soc., 1477 (1947)], twenty parts 4-bromo-m-thiocresol and 5 drops triethylamine is heated at 100° C. for 15 minutes. The resulting brown oil is essentially pure 1-methyl-2-nitropropyl 4-bromo-m-tolyl sulfide: $n^{25}$D 1.5587.

Example 17.—Preparation of 1-methyl-2-nitropropyl 4-bromo-m-tolyl sulfone: Sixty-one parts of 1-methyl-2-nitropropyl 4-bromo-m-tolyl sulfide is diluted with four hundred parts of chloroform and cooled to 0–5° C. in an ice bath. Seventy-six parts of 40% peracetic acid is added dropwise to this stirred solution which is maintained below 10° C. during the addition. The solution is stirred at 5° C. for one hour and then overnight at room temperature. The solvent is evaporated and the white solid which forms is diluted with hexane and collected by filtration. Thirty parts of essentially pure 1-methyl-2-nitropropyl 4-bromo-m-tolyl sulfone is obtained. The compound is purified by recrystallization from ethanol to give twenty-five parts of product, M.P. 104–109° C.

The following compounds are prepared as in Examples 8 through 17 by substituting the listed thiophenols or benzyl mercaptans and nitroalkenes set forth in the table for the thiophenols or benzyl mercaptans and nitroalkenes in Examples 8 through 17.

| Thiophenol starting reactant | Nitroalkene starting reactant | Sulfone product |
|---|---|---|
| Thiophenol | 1-nitro-1-propene | 1-methyl-2-nitroethyl phenyl sulfone, M.P., 72–73.5° C. |
| o-Chlorothiophenol | 1-nitro-1-hexene | 1-butyl-2-nitroethyl o-chlorophenyl sulfone. |
| m-Hydroxythiophenol | 3-nitro-2-methyl-2-heptene | 1,1-dimethyl-2-nitrohexyl m-hydroxyphenyl sulfone. |
| 4-bromo-m-thiocresol | 1-nitro-1-pentene | 1-propyl-2-nitroethyl 4-bromo-m-tolyl sulfone, M.P., 65–68° C. |
| p-Nitrothiophenol | 1-nitro-1-propene | 1-methyl-2-nitroethyl p-nitrophenyl sulfone, M.P., 103–108° C. |
| m-Methoxythiophenol | do | 1-methyl-2-nitroethyl m-methoxyphenyl sulfone. |
| p-Bromothiophenol | do | 1-methyl-2-nitroethyl p-bromophenyl sulfone, M.P., 82–83° C. |
| p-Hydroxythiophenol | 1-nitro-2-methyl-1-hexene | 1-butyl-1-methyl-2-nitroethyl p-hydroxyphenyl sulfone. |
| p-Dodecylthiophenol | 1-nitro-1-propene | 1-methyl-2-nitroethyl p-dodecylphenyl sulfone. |
| p-Chlorothiophenol | do | 1-methyl-2-nitroethyl p-chlorophenyl sulfone, M.P., 58–59.5° C. |
| p-Methoxythiophenol | do | 1-methyl-2-nitroethyl p-methoxyphenyl sulfone, M.P., 48–52° C. |
| 2-naphthalenethiol | 1-nitro-1-butene | 1-ethyl-2-nitroethyl 2-naphthyl sulfone. |
| o-Thiocresol | 1-nitro-2-methyl-1-propene | 1,1-dimethyl-2-nitroethyl o-tolyl sulfone, M.P., 64–67° C. |
| p-Chlorothiophenol | do | 1,1-dimethyl-2-nitroethyl p-chlorophenyl sulfone, M.P., 100–101° C. |
| o-Thiocresol | 2-nitro-2-butene | 1-methyl-2-nitropropyl o-tolyl sulfone. |
| p-Bromothiophenol | do | 1-methyl-2-nitropropyl p-bromophenyl sulfone, M.P., 81–89° C. |
| o-Nitrothiophenol | 1-nitro-2-n-butyl-1-hexene | 1,1-dibutyl-2-nitroethyl o-nitrophenyl sulfone. |
| p-n-Butoxythiophenol | 2-nitro-3-methyl-2-butene | 1,1-dimethyl-2-nitropropyl p-n-butoxyphenol sulfone. |
| p-Flurothiophenol | 2-nitro-3-n-butyl-2-heptene | 1,1-dibutyl-2-nitropropyl p-fluorophenyl sulfone. |
| m-Thiocresol | 1-nitro-1-propene | 1-methyl-2-nitroethyl m-tolyl sulfone, M.P., 98–99° C. |
| o-Ethylthiophenol | 5-nitro-6-n-butyl-5-decene | 1,1-dibutyl-2-nitrohexyl o-ethylphenyl sulfone. |
| o-Ethoxythiophenol | 5-nitro-6-methyl-5-decene | 1-butyl-1-methyl-2-nitrohexyl o-ethoxyphenyl sulfone. |
| m-Iodothiophenol | 5-nitro-5-decene | 1-butyl-2-nitrohexyl m-iodophenyl sulfone. |
| p-t-Butylthiophenol | 1-nitro-1-propene | 1-methyl-2-nitroethyl p-t-butylphenyl sulfone, M.P., 88.9–90.5° C. |
| 1-naphthalenethiol | 1-nitro-1-hexene | 1-butyl-2-nitroethyl 1-naphthyl sulfone. |
| Thiophenol | 2-nitro-2-butene | 1-methyl-2-nitropropyl phenyl sulfone. |
| Do | 2-nitro-2-heptene | 1-butyl-2-nitropropyl phenyl sulfone. |
| m-Isopropylthiophenol | 2-nitro-3-methyl-2-heptene | 1-butyl-1-methyl-2-nitroethyl m-isopropylphenyl sulfone. |
| m-t-Butoxythiophenol | 1-nitro-1-propene | 1-methyl-2-nitroethyl m-t-butoxyphenyl sulfone. |
| 3,4-dichlorothiophenol | 2-nitro-2-hexene | 1-propyl-2-nitropropyl 3,4-dichlorophenyl sulfone. |
| 4-bromo-m-thiocresol | 1-nitro-1-propene | 1-methyl-2-nitroethyl 4-bromo-m-tolyl sulfone, M.P., 101–103° C. |
| 2-chloro-4-methoxythiophenol | 1-nitro-1-pentene | 1-propyl-2-nitroethyl 2-chloro-4-methoxyphenyl sulfone. |
| 3-hydroxy-4-iodothiophenol | 3-nitro-2-methyl-2-pentene | 1,1-dimethyl-2-nitrobutyl 3-hydroxy-4-iodophenyl sulfone. |
| 2-hydroxy-p-thiocresol | 3-nitro-2-heptene | 1-methyl-2-nitrohexyl 2-hydroxy-p-tolyl sulfone. |
| 2-hydroxy-5-methoxythiophenol | 2-nitro-2-pentene | 1-ethyl-2-nitropropyl 2-hydroxy-5-methoxyphenyl sulfone. |
| 2,4-dimethylthiophenol | 1-nitro-1-propene | 1-methyl-2-nitroethyl 2,4-dimethylphenyl sulfone. |
| 5-ethoxy-m-thiocresol | do | 1-methyl-2-nitroethyl 5-ethoxy-m-tolyl sulfone. |
| 3-nitro-4-bromothiophenol | 2-nitro-2-hexene | 1-propyl-2-nitropropyl 3-nitro-4-bromophenyl sulfone. |
| 2-nitro-4-ethylthiophenol | 2-nitro-2-butene | 1-methyl-2-nitropropyl 2-nitro-4-ethylphenyl sulfone. |
| 3-methoxy-5-nitrothiophenol | 1-nitro-1-pentene | 1-propyl-2-nitroethyl 3-methoxy-5-nitrophenyl sulfone. |
| 4-bromo-m-thiocresol | 2-nitro-2-butene | 1-methyl-2-nitropropyl 4-bromo-m-tolyl sulfone, M.P., 104–109° C. |

| Benzyl mercaptan starting reactant | Nitroalkene starting reactant | Sulfone product |
|---|---|---|
| Benzyl mercaptan | 3-nitro-2-methyl-2-heptene | 1,1-dimethyl-2-nitrohexyl benzyl sulfone. |
| p-Chlorobenzyl mercaptan | 1-nitro-1-butene | 1-ethyl-2-nitroethyl p-chlorobenzyl sulfone. |
| o-Hydroxybenzyl mercaptan | 1-nitro-2-methyl-1-hexene | 1-butyl-1-methyl-2-nitroethyl o-hydroxybenzyl sulfone. |
| p-Dodecylbenzyl mercaptan | 1-nitro-1-propene | 1-methyl-2-nitroethyl p-dodecylbenzyl sulfone. |
| m-Methylbenzyl mercaptan | 1-nitro-2-methyl-1-propene | 1,1-dimethyl-2-nitroethyl m-methylbenzyl sulfone. |
| m-Nitrobenzyl mercaptan | 2-nitro-2-butene | 1-methyl-2-nitropropyl m-nitrobenzyl sulfone. |
| o-Methoxybenzyl mercaptan | 1-nitro-2-n-butyl-1-hexene | 1,1-dibutyl-2-nitroethyl o-methoxybenzyl sulfone. |
| p-t-Butoxybenzyl mercaptan | 2-nitro-3-methyl-2-butene | 1,1-dimethyl-2-nitropropyl p-t-butoxybenzyl sulfone. |
| p-Methoxybenzyl mercaptan | 1-nitro-1-propene | 1-methyl-2-nitroethyl p-methoxybenzyl sulfone. |
| m-Bromobenzyl mercaptan | 2-nitro-2-n-butyl-2-heptene | 1,1-dibutyl-2-nitropropyl m-bromobenzyl sulfone. |
| p-Ethylbenzyl mercaptan | 5-nitro-6-methyl-5-decene | 1-butyl-1-methyl-2-nitrohexyl p-ethylbenzyl sulfone. |
| 3,4-dimethoxybenzyl mercaptan | 5-nitro-5-decene | 1-butyl-2-nitrohexyl 3,4-dimethoxybenzyl sulfone. |
| 2,5-dibromobenzyl mercaptan | 1-nitro-1-hexene | 1-butyl-2-nitroethyl 2,5-dibromobenzyl sulfone. |
| 2-chloro-4-methylbenzyl mercaptan | 2-nitro-2-heptene | 1-butyl-2-nitropropyl 2-chloro-4-methylbenzyl sulfone. |
| 3-bromo-4-methoxybenzyl | 1-nitro-1-propene | 1-methyl-2-nitroethyl 3-bromo-4-methoxybenzyl sulfone. |
| 3-hydroxy-5-chlorobenzyl mercaptan | 3-nitro-2-heptene | 1-methyl-2-nitorhexyl 3-hydroxy-5-chlorobenzyl sulfoxide. |
| 3-methyl-4-hydroxybenzyl mercaptan | 3-nitro-2-methyl-2-pentene | 1,1-dimethyl-2-nitrobutyl 3-methyl-4-hydroxybenzyl sulfone. |
| 2-hydroxy-4-methoxybenzyl mercaptan | 1-nitro-1-pentene | 1-propyl-2-nitroethyl 2-hydroxy-4-methoxybenzyl sulfone. |

TABLE—Continued

| Benzyl mercaptan starting reactant | Nitroalkene starting reactant | Sulfone product |
|---|---|---|
| 2-ethyl-4-decylbenzyl mercaptan | 2-nitro-2-pentene | 1-ethyl-2-nitropropyl 2-ethyl-4-decylbenzyl sulfone. |
| 2, 5-dimethylbenzyl mercaptan | 1-nitro-1-propene | 1-methyl-2-nitroethyl 2, 5-dimethylbenzyl sulfone. |
| 3-ethoxy-4-methoxybenzyl mercaptan | 2-nitro-2-butene | 1-methyl-2-nitropropyl 3-ethoxy-4-methoxybenzyl sulfone. |
| 3-propoxy-5-methylbenzyl mercaptan | 1-nitro-1-pentene | 1-propyl-2-nitroethyl 3-propoxy-5-methylbenzyl sulfone. |
| 3-nitro-4-bromobenzyl mercaptan | 2-nitro-2-butene | 1-methyl-2-nitropropyl 3-nitro-4-bromobenzyl sulfone. |
| 2-nitro-4-methylbenzyl mercaptan | 1-nitro-1-propene | 1-methyl-2-nitroethyl 2-nitro-4-methylbenzyl sulfone. |
| 3-nitro-5-ethoxybenzyl mercaptan | 1-nitro-1-pentene | 1-propyl-2-nitroethyl 3-nitro-5-ethoxybenzyl sulfone. |
| Alpha-methylbenzyl mercaptan | 1-nitro-1-propene | 1-methyl-2-nitroethyl alpha-methylbenzyl sulfone. |
| Alpha, alpha-dimethylbenzyl mercaptan | 1-nitro-1-butene | 1-ethyl-2-nitroethyl alpha, alpha-dimethylbenzyl sulfone. |

Example 18.—Preparation of 1-methyl-2-nitroethyl isobutyl sulfone: A mixture of thirty-five parts of 1-nitro-1-propene, thirty-six parts of 2-methyl-1-propanethiol and 5 drops triethylamine is allowed to stand at room temperature for 15 minutes. The resulting colorless, oily, 1-methyl-2-nitroethyl isobutyl sulfide is dissolved in 500 parts of chloroform and cooled to 0–5° C. Forty percent peracetic acid (152 parts) is added dropwise to this stirred solution which is maintained below 10° C. during the addition. The solution is stirred for one hour at 5° C. and then overnight at room temperature. The solvent is evaporated under reduced pressure. The resulting colorless oil is essentially pure 1-methyl-2-nitroethyl isobutyl sulfone: $n^{25}D$ 1.4730; NMR ($CDCl_3$) δ 1.18 (d., 6, J=6 Hz., $(CH_3)_2CH$—), 1.55 (d., 3, J=7 Hz., $$CH_3\overset{|}{C}H—)$$

2.44 (m., 1, $(CH_3)_2$—CH—), 3.03 (d., 2, J=6 Hz., —$CHCH_2$—$SO_2$—), 3.97 (m., 2, —$CH_2NO_2$) and 4.80 p.p.m. (m., 1, $$SO_2—\overset{|}{C}H—)$$

The following compounds are prepared as in Example 18 by substituting the listed mercaptans and nitroalkenes set forth in the table for the mercaptan and nitroalkene in Example 18.

| Mercaptan starting reactant | Nitroalkene starting reactant | Sulfone product |
|---|---|---|
| n-Hexyl mercaptan | 1-nitro-1-hexene | 1-butyl-2-nitroethyl n-hexyl sulfone. |
| n-Butyl mercaptan | 1-nitro-1-propene | 1-methyl-2-nitroethyl n-butyl sulfone. |
| Sec-butyl mercaptan | 1-nitro-2-methyl-1-hexene | 1-butyl-1-methyl-2-nitroethyl sec-butyl sulfone. |
| Ethyl mercaptan | 2-nitro-2-heptene | 1-butyl-2-nitropropyl ethyl sulfone. |
| Isopropyl mercaptan | 2-nitro-3-methyl-2-butene | 1,1-dimethyl-2-nitropropyl isopropyl sulfone. |
| Cyclopropyl mercaptan | 5-nitro-5-decene | 1-butyl-2-nitrohexyl cyclopropyl sulfone. |
| Cyclopentyl mercaptan | 2-nitro-3-methyl-2-heptene | 1-butyl-1-methyl-2-nitropropyl cyclopentyl sulfone. |
| 2-methylcyclohexyl mercaptan | 1-nitro-1-propene | 1-methyl-2-nitroethyl 2-methylcyclohexyl sulfone. |
| 4-methylcloylhexyl mercaptan | 2-nitro-2-butene | 1-methyl-2-nitropropyl 4-methylcyclohexyl sulfone. |
| 1-methylcyclopropyl mercaptan | 1-nitro-2-methyl-1-hexene | 1-butyl-1-methyl-2-nitroethyl 1-methylcyclopropyl sulfone. |
| 2,3-dimethylcyclopropyl mercaptan | 2-nitro-3-methyl-2-butene | 1,1-dimethyl-2-nitropropyl 2,3-dimethylcyclopropyl sulfone. |
| 2,3-dimethylcyclobutyl mercaptan | 1-nitro-2-ethyl-1-hexene | 1-ethyl-1-butyl-2-nitroethyl 2,3-dimethylcyclobutyl sulfone. |
| 3,4-dimethylcyclopentyl mercaptan | 1-nitro-1-pentene | 1-propyl-2-nitroethyl 3,4-dimethylcyclopentyl sulfone. |
| 2-ethylcyclopentyl mercaptan | 2-nitro-2-butene | 1-methyl-2-nitropropyl 2-ethylcyclopentyl sulfone. |
| Cyclohexylmethyl mercaptan | 1-nitro-1-pentene | 1-propyl-2-nitroethyl cyclohexylmethyl sulfone. |
| Cyclopropylmethyl mercaptan | 1-nitro-1-propene | 1-methyl-2-nitroethyl cyclopropylmethyl sulfone. |
| Cyclopropylethyl mercaptan | 1-nitro-2-n-butyl-1-hexene | 1,1-dibutyl-2-nitroethyl cyclopropylethyl sulfone. |
| 2-methylcyclohexyl mercaptan | 1-nitro-1-hexene | 1-butyl-2-nitroethyl 2-methylcyclohexyl sulfone. |
| Cyclopentylmethyl mercaptan | 1-nitro-1-propene | 1-methyl-2-nitroethyl cyclopentylmethyl sulfone. |
| Methyl mercpatan | 2-nitro-2-butene | 1-methyl-2-nitropropyl methyl sulfone. |
| n-Butyl mercaptan | 1-nitro-1-pentene | 1-propyl-2-nitroethyl n-butyl sulfone. |
| Methyl mercaptan | 1-nitro-1-propene | 1-methyl-2-nitroethyl methyl sulfone. |
| Cyclohexyl mercaptan | 1-nitro-1-penetene | 1-propyl-2-nitroethyl cyclohexyl sulfone. |

UTILITY EXAMPLES

Example 19:

| | Percent |
|---|---|
| 1-phenyl-2-nitroethyl 2-naphthyl sulfone | 50 |
| Dialkyl ester of sodium sulfosuccinic acid | 2 |
| Partially desulfonated sodium ligninsulfonate | 3 |
| Kaolin | 45 |

The above ingredients are blended and hammer milled. This product is then ground in a fluid energy mill to yield a water dispersible powder in which essentially all particles of active ingredient are 5 microns or less.

A uniform field planting of Irish potatoes is selected. Alternate rows are sprayed with water containing a suspension of the wettable powder described above. The amount of wettable powder used is such as to provide 1 gram of the active compound of this invention per liter of water. The spray is applied at weekly intervals at the rate of 1,000 liters per hectare. The remaining rows are left unsprayed.

Twelve weeks after the initiation of the test, the sprayed rows of Irish potatoes are healthy and growing rapidly. The untreated rows, on the other hand, are heavily infected with the late blight fungus, *Phytophthora infestans*. As a consequence of this fungus infection, the plants in the untreated rows are dead or dying and will produce a reduced yield.

Many of the other active compounds of this invention may be formulated and applied in like manner; like results are obtained.

Example 20:

| | Percent |
|---|---|
| 1-phenyl-2-nitroethyl p-tert-butylphenyl sulfone | 70 |
| Sodium alkylnapthalenesulfonate | 3 |
| Oleic ester of sodium isethionate | 2 |
| Diatomaceous silica | 25 |

The above ingredients are blended, hammer milled, and then micronized so that essentially all sulfone particles of this water dispersible powder are 5 microns or less.

A uniform field planting of tomatoes is selected. Alternate rows are sprayed with water containing a suspension of the wettable powder described above. The amount of the wettable powder used is much as to provide one gram of the active compound of this invention per liter of water. The spray is applied at weekly intervals at the rate of 1,000 liters per hectare. The remaining rows are left unsprayed.

Twelve weeks after the initiation of the test, the sprayed rows of tomatoes are healthy and growing rapidly. The untreated rows, on the other hand, are heavily infected with the early and late blight fungi, *Alternaria solani* and *Phytophthora infestans*. As a consequence of this fungus infection, the plants in the untreated rows are growing slowly and will clearly provide less yield.

Many of the active compounds of this invention may be formulated and applied in like manner with like results.

Example 21:

| | Percent |
|---|---|
| 1-phenyl-2-nitroethyl benzyl sulfone | 25 |
| Calcium/magnesium ligninsulfonate | 15 |
| Hydrated attapulgite | 2 |
| Pentachlorophenol | 0.5 |
| Sodium carbonate | 2 |
| Water | 55.5 |

After mixing, the above ingredients are sand ground until essentially all particles of active compound are 5 microns or less.

A uniform field planting of Irish potatoes is selected. One-half of the field is aerially sprayed with water containing a suspension of the formulation described above. The amount of formulation used is such as to provide 1 kilogram of the active compound of this invention per hectare. The spray is applied biweekly. The remaining half of the field is left unsprayed.

Twelve weeks after the initiation of the test, the Irish potatoes in the sprayed half of the field are healthy and growing rapidly. In the untreated half, the Irish potatoes are heavily infected with the late blight fungus, *Phytophthora infestans,* and the plants are dead or dying, and the yield will be markedly reduced.

Many of the other active compounds of this invention may be substituted one at a time for 1-phenyl-2-nitroethyl benzyl sulfone in like amount of weight. If formulated and applied in like manner, similar results are obtained.

| Example 22: | Percent |
|---|---|
| 1-phenyl-2-nitroethyl m-methoxyphenyl sulfone | 22 |
| Mixed polyoxyethylene ethers and oil soluble sulfonates | 10 |
| Aliphatic spray oil, 60 sec. viscosity | 68 |

A mixture of the above ingredients is sand ground until essentially all particles of the sulfone are 5 microns or less.

The above formulation is dispersed in water to give an active ingredient concentration of 800 p.p.m. Eight uniform peach trees of the same variety are selected for testing. Four of these are sprayed to run-off at weekly intervals during the growing season with the above formulation. The other four trees are left unsprayed.

By the end of the season the unsprayed trees are highly infected with the peach scab fungus, *Cladosporium carpophilum.* The trees sprayed with the above formulation are essentially free of peach scab.

| Example 23: | Percent |
|---|---|
| 1-methyl-2-nitroethyl methyl sulfone | 10 |
| Aralkyl polyethoxyethanol | 1 |
| Attapulgite | 25 |
| Micaceous talc | 64 |

Active ingredient, surfactant, and attapulgite are blended, hammer milled, and then ground in a fluid energy mill. This product is blended with the talc to give a freely flowing, finely divided dust.

The formulation is thoroughly mixed with a portion of a commercial protein dairy feed mixture at a rate to provide 0.1% of active ingredient as based on the weight of the feed. Mold growth is prevented for 26 days with only a trace of ammonia evolution. Under similar conditions in an identical but untreated feed sample, mold growth and substantial ammonia evolution are observed after 12 days.

Many of the compounds of this invention can be formulated and mixed with feeds such as that described above, or with newly harvested grains, such as corn or sorghum for the prevention of their spoilage when used as animal feeds.

| Example 24: | Percent |
|---|---|
| Wettable powder of Example 19 | 10 |
| Micaceous talc | 90 |

The above ingredients are blended to yield a freely flowing dust.

A uniform field planting of cantaloupe in North Carolina is selected. Half of the field is dusted with the formulation described above at a rate of 10 kilograms per hectare. The remaining half of the field is left undusted.

The entire field is inoculated with downy mildew fungus (*Pseudoperonospora cubensis*) by spraying a spore suspension onto the foliage as dew was beginning to form. After 15 days, the undusted portion of the field is heavily damaged and some of the plants are dying. The dusted half, however, is healthy and growing rapidly.

| Example 25: | Percent |
|---|---|
| 1-phenyl-2-nitroethyl m-methoxyphenyl sulfone | 15 |
| Mixed polyoxyethylene ethers and oil soluble sulfonates | 10 |
| Xylene | 75 |

Mixing the above ingredients yields a homogeneous solution which may be used directly in low volume applications or which may be added to water or additional solvent for conventional application.

A uniform field planting of corn is selected. One-half of the field is aerially sprayed with water containing a suspension of the formulation described above to provide a concentration of 1 kilogram of the active compound of this invention per hectare. The spray is applied biweekly. The remaining half of the field is left unsprayed.

Twelve weeks after the initiation of the test, the corn in the sprayed half of the field is healthy and growing rapidly. In the untreated half, the corn is heavily infected with the leaf blight fungus, *Helminthosphorium maydis,* and drastic reduction in yield is clearly evidenced.

| Example 26: | Percent |
|---|---|
| 1-phenyl-2-nitroethyl o-tolyl sulfone | 15 |
| Polyoxyethylene ethers and esters | 5 |
| Dimethylformamide | 80 |

The above ingredients are mixed to yield a homogeneous solution particularly suitable for low volume applications. It may, of course, also be diluted for conventional application.

Eight uniform apple trees of the same variety are selected for testing. Four of these are sprayed at biweekly intervals during the growing season with the above formulation. The spray concentration and rate of application is adjusted to result in a treatment of 2 kilograms of active ingredient per hectare. The other four trees are left unsprayed.

By the end of the season, the unsprayed trees are highly infected with the apple scab fungus, *Venturia inaequalis.* The trees sprayed with the above formulation are free of apple scab.

Many of the other active compounds of this invention may be substituted one at a time for 1-phenyl-2-nitroethyl-o-tolyl sulfone in like amount and applied in like manner with like results.

The following example is typical of useful combinations and mixtures in which the compounds of this invention may be used.

| Example 27: | Percent |
|---|---|
| 1-phenyl-2-nitroethyl o-tolyl sulfone | 15 |
| Polyoxyethylene ethers and esters | 5 |
| Dimethylformamide | 80 |

A uniform grape vineyard is selected. Alternate rows are sprayed with water containing a mixture of a commercial formulation of Benlate® benomyl fungicide at a rate of 400 p.p.m. and a formulation of 1-phenyl-2-nitroethyl o-tolyl sulfone at a rate of 400 p.p.m. The spray is applied to run-off at biweekly intervals. The remaining rows are left unsprayed.

Twelve weeks after the initiation of the test, the sprayed rows of grapes are healthy and growing rapidly. The untreated rows, however, are heavily diseased with downy mildow caused by *Plasmorpara viticola,* powdery mildew caused by *Uncinula necator,* and gray mold caused by *Botrytis cinerea.* As a consequence of these fungal infections, yield will be greatly reduced.

| Example 28.—Wettable powder: | Percent |
|---|---|
| 1-methyl-2-nitroethyl p-methoxyphenyl sulfone | 65 |
| Dodecylphenol polyethylene glycol ether | 2 |
| Sodium ligninsulfonate | 4 |
| Sodium silicoaluminate | 6 |
| Montmorillonite (calcined) | 23 |

The ingredients are thoroughly blended. The liquid surfactant is added by spraying upon the solid ingredients in the blender. After grinding in a hammer mill to produce particles essentially all below 100 microns, the material is reblended and sifted through a U.S.S. No. 50 sieve (0.3 mm. opening) and packaged.

The formulation is thoroughly mixed with a portion of a commercial poultry feed mixture at a rate to provide 0.1% of active ingredient as based on the weight of the feed. Mold growth was inhibited for the one-month storage period. Under similar conditions in an identical but untreated feed sample, mold growth and substantial ammonia evolution are observed after 21 days.

Example 29.—The formulation of Example 28 is modified by substituting for the p-methoxyphenyl 1-methyl-2-nitroethyl sulfone an equivalent quantity of 2-naphthyl 1-methyl-2-nitroethyl sulfone.

This wettable powder is added to transplant water used in watering newly transplanted tobacco plants at a concentration of 80 p.p.m. This water also contains oxamyl [S-methyl 1-(dimethylcarbamoyl) - N - [(methylcarbamoyl)oxy]thioformimidate] at a concentration of 100 p.p.m. Individual tobacco plants are watered immediately after transplanting with 250 ml. of the water containing these compounds. The wettable powder formulation protects the growing plants against invasion by black shank (*Phytopthora parasitica*), and the oxamyl protects against plant parasitic nematodes. Fields of tobacco so treated have a higher number of surviving plants which go on to produce a greater yield of higher quality tobacco leaf. Adjacent untreated fields suffer the ravages of black shank and nematodes with consequent lower yields and proorer quality.

| Example 30.—Aqueous suspension: | Percent |
|---|---|
| 1-methyl-2-nitroethyl o-tolyl sulfone | 50.0 |
| Polyacrylic acid thickener | 0.3 |
| Dodecylphenol polyethyleneglycol ether | 0.5 |
| Polyvinyl alcohol | 1.0 |
| Pentachlorophenol | 0.4 |
| Water | 47.8 |

The ingredients are ground together in a sand mill to produce particles essentially all under 5 microns in size.

Three kilograms (active) of this formulation is stirred into 500 liters of water and sprayed into a 9000 meter section of open furrow in which beans have just been placed. The bean seeds germinate and develop into a healthy stand free of infection by both Pythium spp. and *Rhizoctonia solani*. As a result the treated portion of the field produces a much higher yield of beans than a similar but untreated area in the same field.

| Example 31.—Emulsifiable concentrate: | Percent |
|---|---|
| p-Methoxyphenyl 1-methyl-2-nitroethyl sulfone | 35.0 |
| Chlorobenzene | 59.0 |
| Sorbitan monostearate and polyoxyethylene condensates thereof | 6.0 |

The ingredients are combined and stirred to produce a solution. The product can be emulsified in water for application.

Four kilograms (active) of this formulation are diluted with 600 liters of water and sprayed into a 9000 meter section of open furrow into which sugarcane seed pieces have just been placed. The furrow is then closed. The sugarcane seed pieces in the treated area germinate and grow in a much more uniform fashion than those in a similar but untreated area of the cane field. By controlling Pythium spp. the stand of plants per acre is increased and the yield of sugar obtained from the treated area is greater than that obtained from a similar but untreated area.

| Example 32: | Percent |
|---|---|
| 1-methyl-2-nitroethyl butyl sulfone | 10 |
| Mixed polyoxyethylene ethers and oil-soluble sulfonates | 4 |
| Xylene | 86 |

The ingredients are combined and stirred to yield a homogeneous solution.

Two kilograms (active) of this formulation are stirred into 600 liters of water and sprayed into a 9000 meter section of open furrow into which bean seeds have been placed. The furrow is then closed. The bean seeds germinate and develop into a healthy stand free of infection by Pythium spp. and *Fusarium solani*. As a result the treated portion of the field produces a much higher yield than a similar untreated portion.

What is claimed is:

1. A compound of the formula:

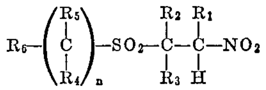

where $R_1$ and $R_2$ are each independently hydrogen or alkyl of 1–4 carbon atoms;

$R_3$ is alkyl of 1–4 carbon atoms or phenyl;

$R_4$ and $R_5$ are each independently hydrogen or methyl;

$R_6$ is alkyl of 1–6 carbon atoms, cycloalkyl of 1–6 carbon atoms, alkylcycloalkyl of 4–7 carbon atoms, cycloalkylalkyl of 4–7 carbon atoms, 1- or 2-naphthyl or

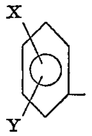

wherein

X is halogen, methoxy, o-methyl or m-methyl;

Y is hydrogen; and $n$ is 0 or 1 provided that when $R_6$ is other than aryl, $n$ is 0 and $R_3$ must be alkyl of 1–4 carbon atoms.

2. The compound of claim 1 wherein $R_3$ is alkyl of 1–4 carbon atoms.

3. The compound of claim 1 wherein $R_3$ is phenyl.

4. The compound of claim 1 wherein $R_3$ is phenyl and $R_6$ is 1- or 2-naphthyl or

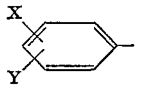

where

X is halogen, methoxy, o-methyl, or m-methyl;

Y is hydrogen; and $n$ is 0 or 1.

5. The compound of claim 1 that is 1-methyl-2-nitroethyl o-tolyl sulfone.

6. The compound of claim 1 that is 1-methyl-2-nitroethyl n-butyl sulfone.

7. The compound of claim 1 that is 1-methyl-2-nitroethyl methyl sulfone.

8. The compound of claim 1 that is 1-phenyl-2-nitroethyl 2-naphthyl sulfone.

9. The compound of claim 1 that is 1-phenyl-2-nitroethyl m-tolyl sulfone.

10. The compound of claim 1 that is 1-phenyl-2-nitroethyl m-methoxyphenyl sulfone.

References Cited

UNITED STATES PATENTS 2,447,974 8/1948 Buckley ---------- 260—607 A

OTHER REFERENCES

Heath: J. Chem. Soc., part II, 1947, pp. 1477–1481.

Kharasch: J. Amer. Chem. Soc., vol. 75, Mar. 5, 1953, pp. 1077–1081.

Cason. J. Amer. Chem. Soc., vol. 73, pp. 142–145.

LEWIS GOTTS, Primary Examiner

D. R. PHILLIPS, Assistant Examiner

U.S. Cl. X.R.

424—337

PO-1050
(5/69)

UNITED STATES PATENT OFFICE
CERTIFICATE OF CORRECTION

Patent No. 3,792,093 Dated February 12, 1974

Inventor(s) GREG A. BULLOCK

It is certified that error appears in the above-identified patent and that said Letters Patent are hereby corrected as shown below:

In Claim 1, Column 24, line 36, "1" second occurrence should be --3--.

Signed and sealed this 22nd day of October 1974.

(SEAL)
Attest:

McCOY M. GIBSON JR.
Attesting Officer

C. MARSHALL DANN
Commissioner of Patents